United States Patent
Mooijman et al.

(10) Patent No.: US 9,725,905 B2
(45) Date of Patent: Aug. 8, 2017

(54) CLOSED HYBRID STRUCTURE AND METHOD

(75) Inventors: Frank Robert Mooijman, Halsteren (NL); Prasad PS, Karnataka (IN)

(73) Assignee: SABIC GLOBAL TECHNOLOGIES IP B.V., Bergen op Zoom (NL)

( * ) Notice: Subject to any disclaimer, the term of this patent is extended or adjusted under 35 U.S.C. 154(b) by 2437 days.

(21) Appl. No.: 11/766,923

(22) Filed: Jun. 22, 2007

(65) Prior Publication Data
US 2008/0317988 A1 Dec. 25, 2008

(51) Int. Cl.
*E04C 3/29* (2006.01)
*E04C 3/04* (2006.01)
*B62D 29/00* (2006.01)

(52) U.S. Cl.
CPC .............. *E04C 3/29* (2013.01); *B62D 29/001* (2013.01); *B62D 29/004* (2013.01); *E04C 3/04* (2013.01); *Y10T 428/139* (2015.01)

(58) Field of Classification Search
CPC E04C 3/29; E04C 3/04; B62D 29/001; B62D 29/004; Y10T 428/139
USPC .................. 52/846; 428/139, 544; 264/274; 296/193.01
See application file for complete search history.

(56) References Cited

U.S. PATENT DOCUMENTS

| | | | |
|---|---|---|---|
| 5,154,462 A * | 10/1992 | Carpenter | ..................... 293/120 |
| 6,216,763 B1 | 4/2001 | Ruehl et al. | |
| 6,592,174 B1 * | 7/2003 | Rollin et al. | ............. 296/190.08 |
| 6,955,393 B2 | 10/2005 | Staargaard et al. | |
| 7,560,003 B2 * | 7/2009 | Naughton et al. | ............... 156/91 |
| 7,654,002 B2 * | 2/2010 | Dragoi et al. | ............... 29/897.2 |
| 2004/0072006 A1 * | 4/2004 | Staargaard et al. | ........... 428/544 |
| 2004/0108705 A1 | 6/2004 | Witucki | |
| 2006/0121246 A1 * | 6/2006 | Staargaard et al. | ........... 428/139 |

FOREIGN PATENT DOCUMENTS

| | | |
|---|---|---|
| EP | 1724185 A1 | 11/2006 |
| WO | 2006094042 A1 | 9/2006 |
| WO | 2006106230 A1 | 10/2006 |

OTHER PUBLICATIONS

European Patent Publication No. 1724185 A1; Publication Date: Nov. 22, 2006; Abstract Only; 1 page.
International Patent Publication No. 2006106230 A1; Publication Date: Oct. 12, 2006; Abstract Only; 1 page.
(Continued)

*Primary Examiner* — Andrew J Triggs
(74) *Attorney, Agent, or Firm* — Cantor Colburn LLP (57) ABSTRACT

Various hybrid structures and methods of making the hybrid structures are provided. In one embodiment, a hybrid structure includes a backbone member of a first material composition and a secondary member of a second material composition different than the backbone member. The backbone member includes at least one closed portion along the length of the backbone member having a cross-section which varies along the length of the backbone, and the secondary member is disposed about at least a portion of the backbone member. In another embodiment, the secondary member extends about a portion of the external surface of the backbone member, through an opening of the backbone member and to the interior of the backbone member to interlock with the backbone member.

24 Claims, 4 Drawing Sheets

(56) References Cited

OTHER PUBLICATIONS

International Search Report; International Application No. PCT/IB2008/052388; International Filing Date: Jun. 17, 2008; Date of Mailing: Nov. 5, 2008; 8 pages.
Written Opinion of the International Searching Authority; International Application No. PCT/IB2008/052388; International Filing Date: Jun. 17, 2008; Date of Mailing: Nov. 5, 2008; 7 pages.

* cited by examiner

CLOSED HYBRID STRUCTURE AND METHOD

FIELD OF THE INVENTION

The present invention generally relates to hybrid structures comprising at least two different materials. More specifically, the invention relates to hybrid structures having an at least partially closed backbone members.

BACKGROUND

Hybrid structures made of a backbone member and a secondary member which are of different materials are used in the manufacture of high load-bearing applications, such as frames and chassis in the automotive, furniture, and computer industries, for example. A hybrid structures can be made of an open or a closed cross-section backbone member, and a secondary member. The backbone member is often made of metal which provides strength and rigidity, and the secondary member is often made of polymer which can provide strength and functionality. The use of a closed cross-section backbone provides a relatively strong component where the hybrid structure is made, for example, by joining or over-molding a polymeric secondary member to a metal tube that has been shaped by hydroforming. Hybrid structures can also be made using open cross-section backbone members and can allow for design flexibility, such as variation in the width of the backbone member along its length, however, these open structures will have limited torsional and load-carrying capability.

Although the closed cross-section hybrid structures provide for higher torsional rigidity and load-carrying capacity, such hybrid structures can have limitations in achieving cross-section re-shaping and routing of the backbone into complex shapes, for example, in applications which require high bend radii. Another disadvantage of the closed cross-section backbone structure is the limitation on wall thickness and depth to which the backbone can be shaped or drawn while maintaining stable strain distribution throughout the hybrid structure. Not only does this place a constraint in the design of the hybrid structure for an end-use application, but can also result in excess weight, for example, in a hybrid structure made from a tube having a greater wall thickness to prevent wall-thinning in portions of the backbone member during hydroforming.

SUMMARY

The present invention provides for hybrid structures which have greater design flexibility while also providing high torsional rigidity and load carrying capacity due to its closed cross-sections. The hybrid structure of the present invention provides for a backbone member of a first material composition which includes at least one closed portion along the backbone member having a cross-section which varies along the backbone, and a secondary member of a material composition which is different than the backbone member and is disposed about at least a portion of the backbone member. The secondary member extends about at least a portion of an external surface of the backbone member.

In another embodiment, the backbone member includes at least one opening and, the secondary member can extend through the opening of the backbone member and inside the backbone member beyond the edges of the opening to interlock the secondary member and the backbone member. In another embodiment the secondary member is a polymer and the backbone member is a metal or a polymer that is a different composition from that of the secondary member.

The method for making the structural components includes forming a first and second profile members to a desired shape; joining the first profile member and the second profile member to form a backbone member; and molding polymer about at least one of the first and second profile member to form a secondary member which extends about at least a portion of the backbone member. In another embodiment the method further comprises forming at least one opening in the backbone member prior to molding polymer through an opening of at least one of the first and second profile member to form a secondary member which is interlocked with the backbone member.

The present invention significantly increases the opportunity to provide a structural component having lower weight, lower wall thicknesses, and overall increased strength-to-weight ratios. At the same time, at least a portion of the structural component of the present invention maintains a closed section, thereby giving the structure high structural modulus through complex shapes.

DESCRIPTION OF THE DRAWINGS

The various embodiments of the present invention can be understood with reference to the following drawings. The components are not necessarily to scale. Also, in the drawings, like reference numerals designate corresponding parts throughout the several views.

DETAILED DESCRIPTION

Figure 1:
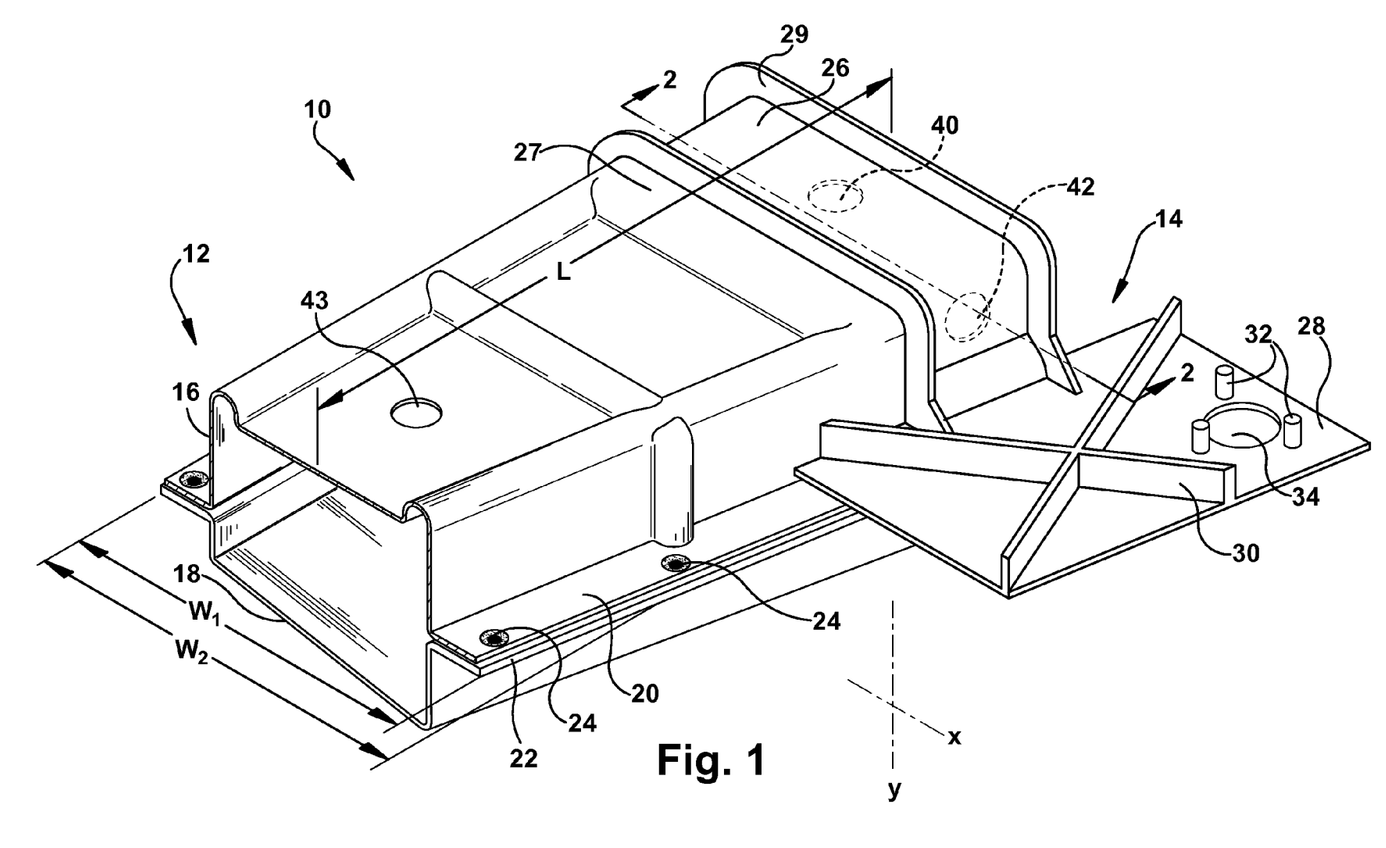
FIG. 1 is a schematic illustration of a hybrid structure which includes a backbone member and a secondary member of two different materials, according to an embodiment of the invention.

FIG. 1 is a perspective view of a hybrid structure 10 which is made of at least two different materials, according to an embodiment of the present invention. Hybrid structure 10 includes a backbone member 12 and a secondary member 14 which is connected to backbone member 12. The backbone member 12 can be made of a first material, for example metal, and the secondary member 14 is made of a material that is different than the backbone member 12, for example polymer, however several additional combinations in addition to metal and polymer are possible.

In one embodiment of the present invention hybrid structure 10 comprises at least one closed portion along the length, L, of backbone member 12, wherein a first cross-section at a first location along the closed portion of length, L, which is different than a second cross-section at a second location along the length, L, of backbone member 12. Secondary member 14 extends about at least a portion of an external surface of the backbone member. The cross-section of the backbone member 12 can vary in shape or size, or both. For example, the shape or configuration of cross-section of the backbone member can be different, and the area defined by the cross-section along one location of the closed portion of the backbone member 12 can be less than or greater than the area defined by the cross-section at another location of the backbone member 12. In another embodiment the height of the backbone member can vary along the width of the backbone member, as will be further described.

In another embodiment of the present invention, backbone structure 12 includes upper profile member 16 and bottom profile member 18 which are connected by one of several well-known methods, as will be described below. The upper portion 16 and lower portion 18 of backbone structure 12 each have a flanged portion 20 and 22, respectively, which line in a plane, for example an x-plane, along which the upper and lower profound members 16, 18 can be joined. For example, there are several connecting points 24 along the length of backbone structure 12. However, it should be understood that flanged portions 20, 22, need not be present. For example, the upper and lower profiles can also be joined such that the ends of the upper and lower profiles are joined along a vertical plane, the y-plane, such that the upper and lower profile members 16, 18, are contiguous.

The hybrid structure 10 includes closed cross-sections which provides rigidity to the module. The hybrid structure 10 can be routed along a path as needed for an in use application where backbone member 12 follows the major load paths. Routing of the hybrid structure 10 can be accomplished by bending the backbone member 12 or by attaching additional backbone members, which may be the same or different size and shape as backbone member 12. In another embodiment, secondary member 14 may be secured to multiple backbone members 12. Also, multiple secondary members 14 may be secured to one or more backbone members 12.

The secondary member 14 when made of polymer can integrate functionality into hybrid structure 10. For example, secondary member 14 can include an outer band portion 26 which extends along the outer surface 27 of backbone 12 and a pocket portion 28 which facilitates the location and attachment of additional components or hardware. Both the outer band portion 26 and the pocket portion 28 can include integral components such as ribs 29, 30, for strengthening the hybrid structure, and pins 32, which eliminate labor and expense in the way of components. In one embodiment, outer band portion 26 of secondary member 14 can extend about or through openings 40 and 42 (in phantom) formed through the backbone member 12. By molding the secondary member 14 to the backbone member 12, the need for separate fasteners to connect the secondary member to the backbone member is eliminated. The secondary member 14 may also include a connection portion to allow for attachment of another component to the hybrid structure 10. For example, the connection portion may be an opening, such as opening 34, or a component integrally formed with the secondary component so that it may be joined to other sections of the hybrid structure or to additional components. The connection portion can also include pins 32 or other members which extend outwardly from the secondary member. Backbone structure 12 can also include additional openings, for example, opening 43 which can connect to another secondary member for purposes of assembly. The openings 34, 40, 42, 43, can be of any shape or configuration.

The geometry of secondary member 14 can function to transfer load to the backbone member 12 and can reinforce load-bearing locations requiring additional strength. For example, the outer band portion 26, or "saddle" provides reinforcement where needed, such as locations at which backbone 12 is connected or attached to another backbone structure (not shown). The secondary member 14 extends inside the backbone member beyond the edge of at least one of the openings 40, 42, 44, of the backbone member 12 such that the secondary member 14 is secured or locked to the backbone member 12 without encapsulating the backbone member. As shown, the backbone 12 can be at least partially sandwiched between secondary member 14, however, it is not necessary that the secondary member 14 extend through an opening of the backbone member and can instead be an over-mold of the backbone 12.

As can be seen according to the example embodiment shown in FIG. 1, the width of the hybrid structure can vary throughout its length, L. For example, the width at a first location $W_1$ is less than the width at a second location $W_2$ along its length, L. It is also possible that the width $W_1$ is greater than $W_2$ or that the width along length L remains constant such that $W_1$ is substantially equal to $W_2$.

Figure 2:
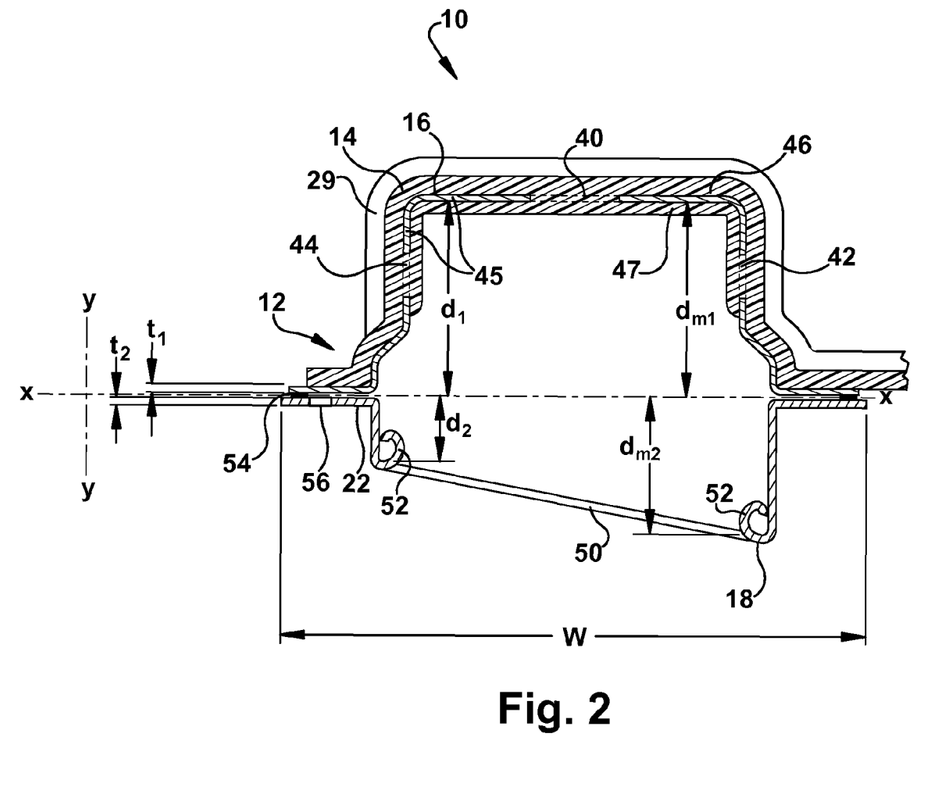
FIG. 2 is a cross-sectional schematic illustration of the hybrid structure taken along lines 2-2 of FIG. 1, according to an embodiment of the invention.

FIG. 2 is a cross sectional illustration taken along lines of 2-2 of hybrid structure 10 of FIG. 1, according to an embodiment of the invention. The cross-sectional illustration shows that upper profile member 16 of backbone member 12 has at least one opening, such as openings 40, 42, and 44, through which secondary member 14 is attached and interlocks with backbone member 12. Lower profile 18 has at least one opening 50 which is free from contact with secondary member 14. As shown, a portion of secondary member 14 contacts the external surface 27 (FIG. 1) of backbone member 12 along upper profile member 16, and a portion of secondary member 14 extends through openings 40, 42 and 44 and also along the internal surface 45 of the backbone member 12. The secondary member, therefore, includes an outer band portion 46 which extends across openings 40, 42 and 44 along the external surface 27 (FIG. 1) of the backbone member 12, and an inner band portion 47 which extends across openings 40, 42 to 44 along the internal surface 45 of the backbone member 12. In this manner, the secondary member 14 is secured to backbone member 12 and by partially infiltrating into the backbone member 12, interlocks the secondary member 14 to backbone member 12.

A point connection which secures secondary member 14 to backbone member 12 is fully described in U.S. Pat. No. 6,955,393 B2, and is hereby incorporated by reference herein. It is appreciated that the connections between the secondary member 14 and the backbone member 12 as described herein, may be made through one or more openings of backbone member 12 and at various locations of backbone structure 12. Although secondary member 14 can be interlocked to backbone member 12 through one opening, the presence of additional openings facilitates molding of the inner band and outer bands to provide additional strength and locking. The connections can be configured in a number of geometric forms, and the "interlocking areas" of the secondary member 14, where the secondary member 14 interfaces with the openings 40, 42, and 44 of the backbone member 12, can include depressions, openings, for example annular openings, and combinations thereof.

Backbone member 12 also includes opening 50 of lower profile member 18 which is free from contact with secondary member 14. At least a portion of opening 50 is located opposite opening 40 of upper profile member 16 can facilitate the formation of secondary member 14 in manufacturing. For example, opening 50 can allow access of a mold core during an injection molding operation which forms secondary member 14 along internal surface of upper profile member 16. Opening 50 may remain open or be closed off after the formation of secondary member 14. The edges 52 of opening 50 of the lower profile member 18, can be turned or curved to help reduce any loss in structural support when the opening is created, however, the edges 52 which define opening 50 can be substantially planar and need not be curved or bent.

FIG. 2 also shows design flexibility in the depth and wall thickness of various portions of backbone member 12 relative to the x-axis, along which the upper and lower profile members 16, 18, are joined. Wall thickness $t_1$ of upper profile 16 can be the same or different than the wall thickness $t_2$ of lower profile member 18. Also, the wall thicknesses $t_1$ and $t_2$ of the profile members 16, 18, can vary along the cross-sectional width, W. The average wall thickness of profile members 16 and 18 across the width, W, of the backbone member can be different, and the mass of the upper and lower profile members can be different. The depths, $d_1$ and $d_2$, of the upper and lower profiles 16, 18, can also vary along the cross-sectional width, W, of the backbone member 12. The height of the backbone member 12, which is the sum of the depths $d_1$ and $d_2$, can also vary along width W. The wall thicknesses $t_1$ and $t_2$ may be thinner in locations along the cross-sectional width W where the depth is greater.

In one embodiment of the invention the upper profile member and the lower profile members can be drawn to the same or different depth at a given cross-section of the hybrid structure 10. FIG. 2 shows upper profile member 16 having a maximum depth, $d_{m1}$, which may or may not be equal to the maximum depth, $d_{m2}$, Of lower profile member 18. For example, as shown in FIG. 2 the maximum depth, $d_{m1}$, of upper profile member 16 can be greater than the maximum depth, $d_{m2}$, of lower profile 18. In addition, the profile member 16 having a maximum depth $d_{m1}$ which is greater than the maximum depth $d_{m2}$, may also have a greater wall thickness $t_1$ than the wall thickness $t_2$ of the shallower profile member 18. For example, if the maximum depth, $d_{m1}$, of upper profile member 16 is at least as great as the maximum depth, $d_{m2}$, of lower profile member 18, the wall thickness, $t_1$, of the upper profile member can be at least as great as the wall thickness, $t_2$, of the lower profile member.

A cross sectional illustration also shows that upper profile member 16 is attached to lower profile member 18 along flanges 20 and 22, respectively. It should be appreciated that additional methods can be used to attach upper and lower profile members 20, 22. For example, upper and lower profile members may be joined by a solder joint 54, or as another example, flange 22 of lower profile member 18 includes an opening 56 through which a screw or fastener can be inserted to be attached to flange 20 of upper profile member 16. Methods by which the upper profile 16 and lower profile member 18 can be joined, include but are not limited to, adhesives, seam welding, seamless welding, spot welding, edge curling, resistance welding, edge bending or any sheet metal joining technique. The weld material can comprise at least one of a metal and a polymer.

In any of the embodiments described above, materials compositions of the backbone member 12 and secondary member 14 are different from one another. The backbone member 12 can be made of several material compositions, which include, but are not limited to metal, ceramics, and polymeric material, such as thermosetting materials or thermoplastic materials, either un-reinforced or reinforced with long fibers or other fillers, or composites. In the case in which the backbone member 12 and the secondary member 14 are both made of polymer, the backbone member 12 is made of a material which has a higher heat deflection temperature (HDT) than the secondary member 14. In such case, the plastic processing operation which applies a molten polymer to the backbone member 12, in forming the secondary member 14, will not distort its shape due to heat. The upper and lower profile members 16, 18, can be made from a non-reinforced polymer, a reinforced polymer, for example, a polymer impregnated with long-glass fiber which is stamped in a press to form two thermoplastic or thermoset open-profile members which are joined to form backbone member 12.

Examples of metal include, but are not limited to, steel, aluminum, magnesium. Examples of non-reinforced or reinforced or filled polymeric material thermoplastic or thermoset material, for example, includes but is not limited to: polyamide (PA), polyester, such as, polyethylene terephthalate (PET), glycol-modified copolyester (PETG), polybutylene terephthalate (PBT), polyolefin, such as, polypropylene (PP), polyethylene (PE), high density polyethylene (HDPE), styrene-acrylonitrile copolymers (SAN), such as, acrylonitrile-styrene-butadiene copolymers (ABS), polycarbonate (PC), polypropylene oxide (PPO), polysulphone, polyphenylene sulfide (PPS), polyphenylene ether blends (PPE), polyimide (PI), polyetherketone (PEEK), polyethylene ether blends (PPE), polymethyl methacrylate (PMMA), polyoxymethylene (POM), liquid crystal polymer (LCP), polyurethane (PU), polytetrafluoroethylene (PTFE), syndiotactic polystyrene (PS) and mixtures, blends and alloys of these polymeric materials. While these suitable materials are provided, any suitable thermoplastic and thermoset materials may be used within the scope of the present invention. Further, fillers or other additives may be added to the polymer to strengthen the hybrid structure. Suitable fillers include, for example, glass, metal, or plastic fiber.

Figure 3A:
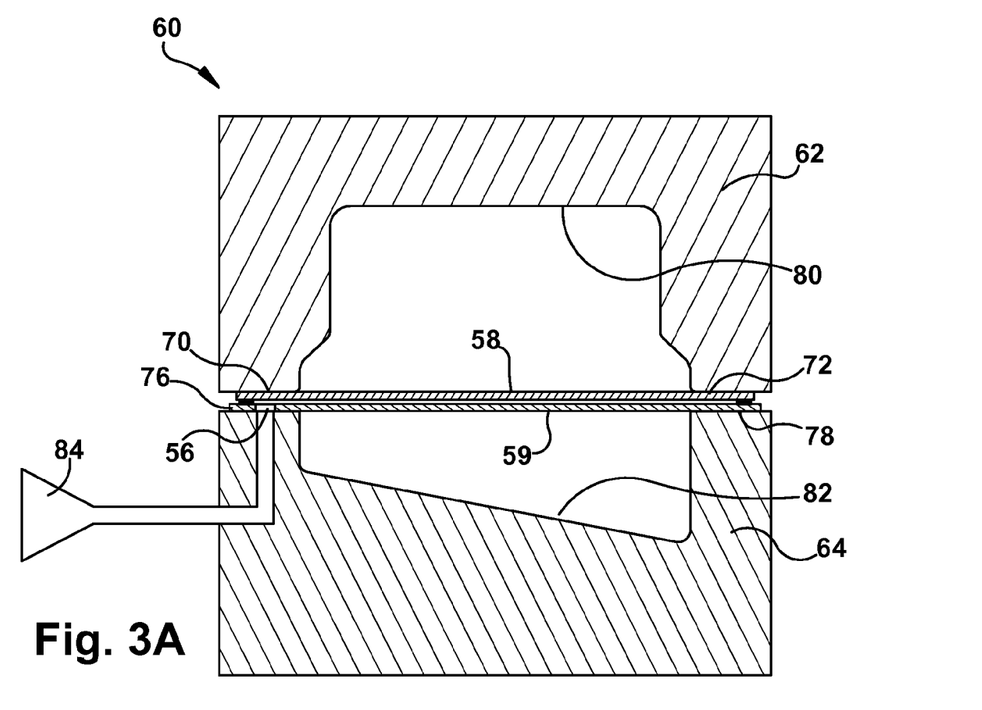
FIGS. 3A and 3B are schematic illustrations of steps of a method for making the hybrid structure of FIGS. 1 and 2, according to an embodiment of the invention.
Figure 3B:
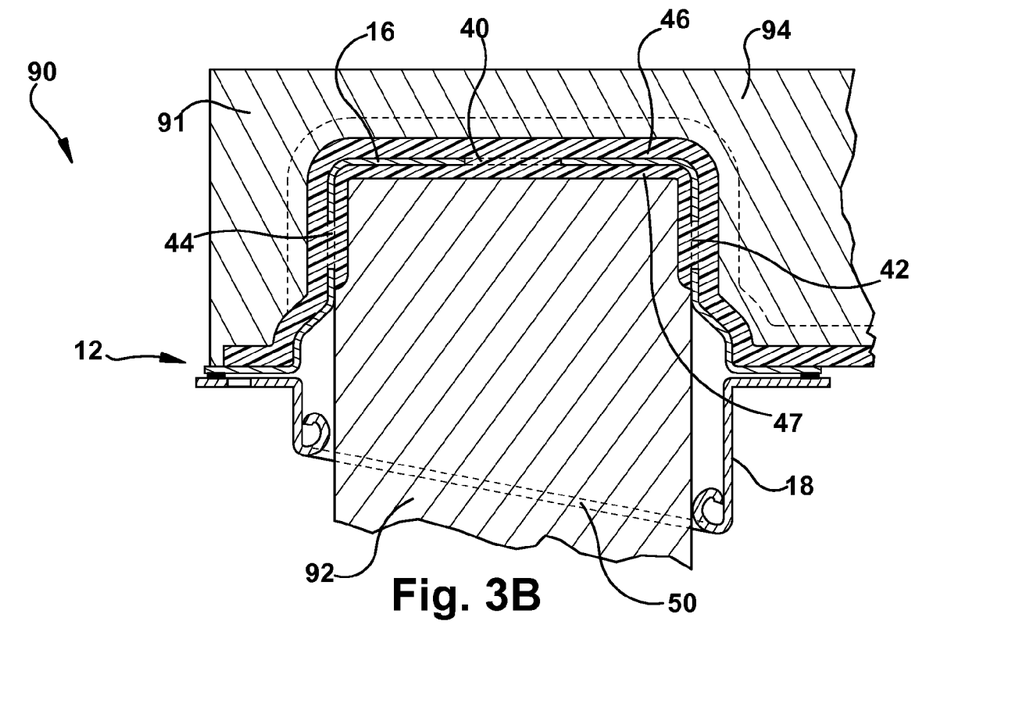

FIGS. 3A and 3B shows the schematic illustration of steps of a process for making hybrid structure 12 of FIGS. 1 and 2, according to an embodiment of the present invention. A process for making the hybrid structure 10 includes forming an upper profile member 16 and a lower profile member 18, and joining the first and second profile members to produce a backbone member in which at least a portion of the backbone member has a closed cross-section, and forcing polymer about the backbone member 12 to produce secondary member 14. In another embodiment, polymer is forced through at least one opening, for example opening 40, of the backbone member 12 to produce a secondary member 14 which is interlocked with the backbone member.

FIGS. 3A and 3B show that hybrid structure 10, can be manufactured, according to an embodiment of the invention, by forming two sheets of material 58 and 59, for example, metal sheet in a hydroforming process, or as another example, a thermoplastic sheet in a thermoforming or stamping process. The two sheets 58 and 59 can be the same or different thicknesses and can be shape-welded or welded at the edges and placed in the die 60 and formed against the top and bottom die 62, 64 to achieve the desired shape defined by the upper and lower surfaces 80, 82 of the die cavity. The use of twin sheets allows for greater freedom in arriving at final geometry and wall thicknesses of the profile members 16 and 18. The formed backbone member 12 is then molded with polymer to produce secondary member 14 (FIGS. 1 and 2).

For example, FIG. 3A shows that two sheets of a material composition can be formed within a die where the die has a cavity corresponding to the desired profile structures. Each sheet can be deformed to provide it with a cross section of continuously smoothly curved elongated profile. When the two sheets are placed inside the die 60 and the sheets may be sealed by applying pressure to the sheet edges 70, 72, 76 and 78. The mold cavity includes or allows access to a pressurized oil or water source 84 after sealing sheets 58 and 59 and the pressure medium enters opening 56 to expand the sheets within the confines of the die cavity.

FIG. 3B shows that formed metal sheets can then be placed in a molding tool 90, for example, an injection-molding tool. The mold is then closed where polymer is forced into the cavity of the molding tool thus forming a secondary member 14 into the desired configuration and simultaneously joining it to the backbone at discrete locations generally indicated at openings 40, 42, 44. That is, secondary member 14 can be joined to the backbone 12 through an opening, for example opening 40 which is formed in the upper profile member.

A core tool 92 is shown inserted through opening 50 formed in the lower profile member and placed adjacent opening 40 on the opposite side of the tool. The core 92 is positioned to form a cavity that allows the polymer to flow inside the backbone member 12 in the cavity formed by the upper profile member 16 and lower profile member 18. In this manner the plastic flows through the openings 40, 42 and 44, but does not fill the entire cavity of the backbone member. Also, connection of the secondary member 14 to the backbone member 12 is made without the need to encapsulate the backbone member 12 and connection can be made such that the secondary member 14 contacts only a portion of the backbone member, for example the upper profile member 16.

The openings 40 and 50 are shown on opposite sides of the backbone member, however, the openings can be along any surface of the backbone component. The backbone member 14, or multiple units thereof, may be placed in a single mold cavity. A core tool 92 is then inserted through the opening 50 and is positioned adjacent the upper openings 40, 42, and 44. The mold cavity guides the flow of polymer to produce a flush contour fit along the surface of the backbone member. The mold core 92, or standoff supports the backbone member from the inside and restricts the flow of polymer to the shape of the inner band 47.

Therefore, when the mold is closed the polymer is forced into the openings 40, 42, 44, and the material flows along the outside surface of the upper profile member 16 to create outer band 46 and through the openings along the inner surface of the upper profile member 16 to form the inner band 47. The molding of polymer to create connections with the backbone structure 12 can take place at discreet locations along the backbone member 12. The contour of the backbone member 12 can be tapered for ease of forming and also ease of molding. For example, the widest section of the backbone member may determine the parting line for an injection molding operation.

While injection method is one method for forming the secondary member, it will be appreciated that any other suitable forming technique may be used within the scope of the present invention. For example, other methods that may be used are but are not limited to, compression molding, injection compression molding, extrusion compress, gas assist or water assist, pressure molding, low pressure molding, blow molding, thermoforming and rotational molding.

Figures 4, 5:
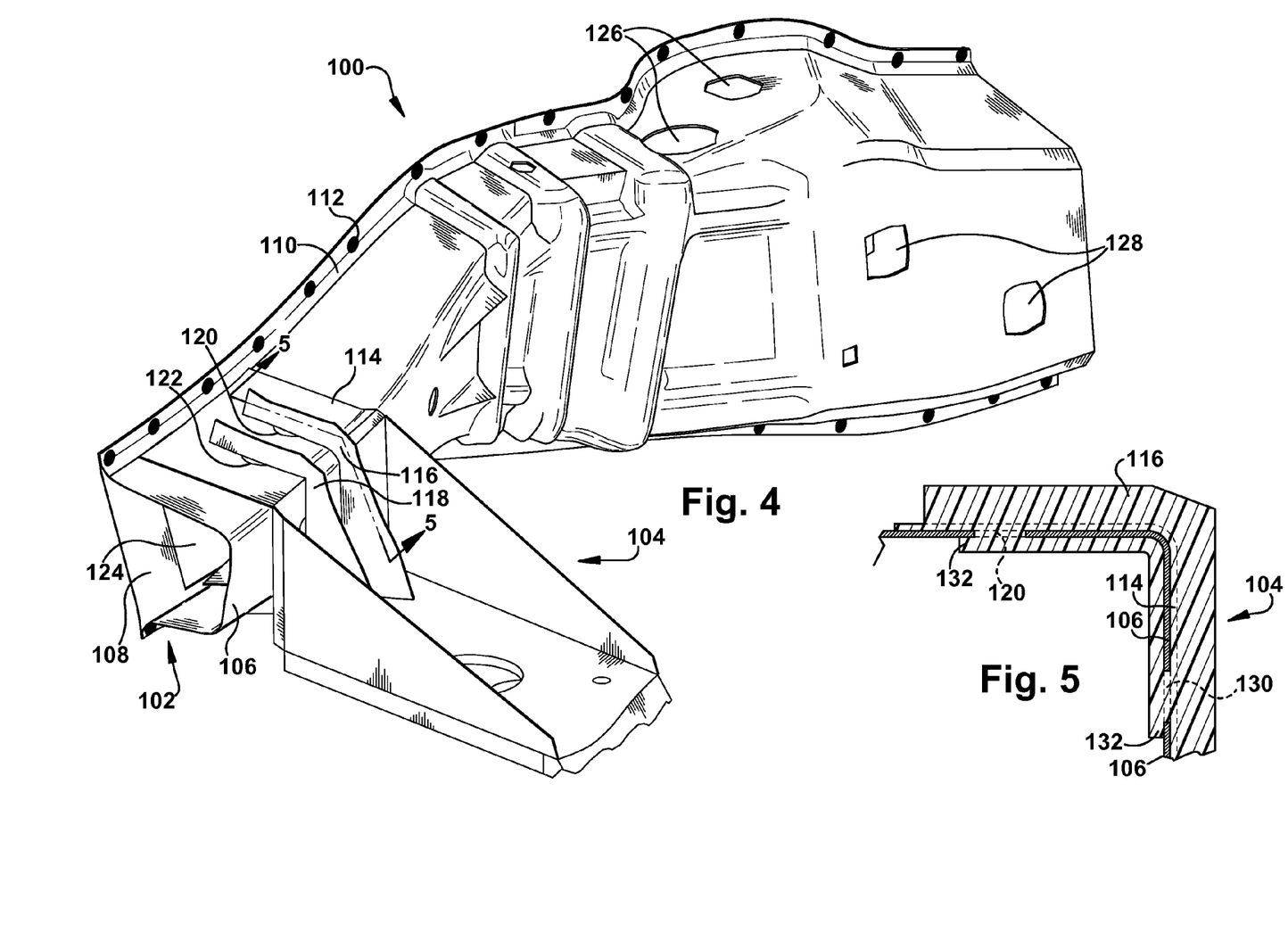
FIG. 4 is a perspective view of a hybrid structure, according to an alternative embodiment of the invention.
FIG. 5 is a cross-sectional schematic illustration of the hybrid structure taken along lines 5-5 of FIG. 4, according to an embodiment of the invention.

FIG. 4 shows a perspective view of a hybrid structure 100 according to an embodiment of the present invention. The hybrid structure 100 is described in connection with a front-end module for use in an automobile, for example, which can receive headlamps, cooling system components, hood latch mechanisms, etc. However, it is to be appreciated the present invention is likewise applicable to all applications wherein two different materials are combined and provide attachment structures for attachment of additional components.

Hybrid structure 100 includes a backbone member 102 which can be curved as shown, thereby having a length which extends along at least two axes, and secondary member 104 which is secured to the backbone member in a fixed relationship. Backbone member 102 has a cross-section which varies in shape and size along the length of the component. Backbone member 102 may include a first profile member 106 and a second profile member 108 which are joined together along flange 110, for example, along a plurality of locations such as 112.

Secondary member 104 includes body 114 and ribs 116 and 118 which extend through openings 120 and 122, respectively, of profile member 106. Body 114 can be the same material as that of ribs 116 and 118, and in alternative embodiments, they can be different materials. For example, body 114 may be made of a polymer and attached to the backbone member 102 when formed. As another example, body 114 may be made of a material different than ribs 116 and 118, for example, and attached to the backbone member 102 when ribs 116 and 118 are formed onto the first profile member 106. Opening 124 of second profile member 106 allows access of a mold core (for example, mold core 92 of FIG. 3B) during molding of the secondary member 104.

The hybrid structure 100 can also include openings 126 and 128 for connection to secondary members alternative to, or in addition to secondary member 104, or for receiving fasteners to secure the module with other components, such as other vehicle components or a vehicle chassis.

FIG. 5 is a cross-sectional illustration of hybrid structure 100 taken along lines 5-5 and through rib 116. As shown, rib 116 forms an outer band which extends through openings 120 and 130 of profile member 106, and also forms an inner band 132 which connects from opening 120 to opening 130. The inner band and outer band portions which extend along at least two axes and following the profile shape of the backbone member 106, provide rigidity and strength to the hybrid structure 100 as well as improved distribution of load at the interconnecting locations along openings 120 and 130.

The resulting hybrid structures, 10 (FIG. 1) and 100 (FIG. 4), according to the example embodiments described herein, have high strength, and excellent strength to weight ratio when thermoplastics are used. Applications for the use of hybrid structures include, but are not limited to, a member for machinery, vehicles, washing machine frames, chassis or housing or electronic machines, for example, computer PCB holders, mobile phone structures, laptop structures, chassis of document handling equipments, such as printers, photo copy machines, scanners, body panels of bikes, farm equipments, instrument panels, rails, office furniture and medical equipment. Large hybrid structures for use in motor vehicle components, for example a structure that is used in the front end of an automobile may be well over 1 meter in a along an axis and can require from about 3 to 10 kilograms of thermoplastic material.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A hybrid structure comprising:
a backbone member comprising a first material composition and a closed portion along the backbone member formed by a first profile member and a second profile member, wherein a first cross-section at a first location along the closed portion is different than a second cross-section at a second location along the closed portion of the backbone member; and
a secondary member comprising a second material composition different than the first material composition and which extends about at least a portion of an external surface of the backbone member;
wherein the height of the backbone member varies along the length of the backbone member, and wherein height is measured along an axis Y and width is measured along an axis X.

2. The hybrid structure of claim 1, wherein the first and second cross-section vary in shape.

3. The hybrid structure of claim 1, wherein the area defined by the first and second cross-sections are different.

4. The hybrid structure of claim 1, wherein the backbone member has at least two openings and a portion of the at least two openings are opposite one another, and wherein at least one opening is through the first profile member, and at least one opening is through the second profile member.

5. The hybrid structure of claim 1, wherein the secondary member comprises a connection portion to allow for attachment of another component to the hybrid structure.

6. The hybrid structure of claim 1, wherein the height of the hybrid structure varies along the width of the backbone member, wherein height is measured along axis Y and width is measured along axis X.

7. A hybrid structure comprising:
a backbone member comprising a first material composition and a closed portion along the backbone member, wherein a first cross-section at a first location along the closed portion is different than a second cross-section at a second location along the closed portion of the backbone member; and
a secondary member comprising a second material composition different than the first material composition and which extends about at least a portion of an external surface of the backbone member;
wherein the backbone member has a first opening and a second opening, and the secondary member extends through and between the first and second openings thereby creating an inner band which extends along an internal surface of the backbone member and an outer band which extends along the external surface of the backbone member to provide reinforcement of the secondary member to the backbone member; and
wherein the length of the backbone member extends along at least two axes such that the portion of the secondary member which extends between the first and second openings extends along at least two non-parallel axes.

8. The hybrid structure of claim 7, wherein:
the secondary member comprises polymer; and
the backbone member comprises materials selected from the group of: metal, ceramics, polymer, and mixtures thereof.

9. The hybrid structure of claim 8, wherein the backbone member comprises metal.

10. A hybrid structure comprising:
a backbone member comprising a first material composition and a closed portion along the backbone member, wherein a first cross-section at a first location along the closed portion is different than a second cross-section at a second location along the closed portion of the backbone member; and
a secondary member comprising a second material composition different than the first material composition and which extends about at least a portion of an external surface of the backbone member;
wherein the backbone member comprises a first profile member and a second profile member which are joined.

11. The hybrid structure of claim 10, wherein the first profile member comprises a first opening through the first profile member and the second profile member comprises a second opening through the second profile member.

12. The hybrid structure of claim 10, wherein at least one of the first profile member and the second profile member comprises at least two openings therethrough.

13. The hybrid structure of claim 10, wherein the first profile member and the second profile member each have a maximum depth which are unequal.

14. The hybrid structure of claim 10, wherein:
the first profile member has a maximum depth and the second profile member has a maximum depth, and the maximum depth of the first profile member is at least as great as the maximum depth of the second profile member; and
the first profile member has a wall thickness at the maximum depth of the first profile member which is at least as great as a wall thickness of the second profile member at the maximum depth of the second profile member.

15. The hybrid structure of claim 10, wherein:
the secondary member comprises polymer; and
the backbone member comprises materials selected from the group of: metal, ceramics, polymer, and mixtures thereof.

16. The hybrid structure of claim 10, wherein the first profile member and the second profile member each have a peripheral flange, and wherein the first and second profile members are joined along the peripheral flanges.

17. The hybrid structure of claim 16, wherein the first profile member and the second profile member are joined by welds comprising at least one of metal and polymer.

18. The hybrid structure of claim 10, wherein the backbone member is joined along a plane, wherein a first wall thickness of the backbone member at a first distance from the plane is at least as great as a second wall thickness of the backbone member at a second distance from the plane, the first distance being greater than the second distance.

19. The hybrid structure of claim 10, wherein the first profile member of the backbone member has an average wall thickness and the second profile member of the backbone member has an average wall thickness, and the average thickness of the first profile member is different than the average thickness of the second profile member.

20. The hybrid structure of claim 10, wherein the first profile member has a greater mass than the second profile member.

21. The hybrid structure of claim 10, wherein:
the first profile member and the second profile member of the backbone member comprises a first opening and a second opening formed therein, respectively; and the secondary member disposed along the external surface of the backbone member extends through the first opening of the backbone member and comprises an edge which extends beyond the opening along an internal surface of the backbone member to lock the secondary member to the backbone member.

22. The hybrid structure of claim 21, wherein:
the first profile member comprises a third opening; and
the secondary member extends between the first and the third openings along an internal surface to form an inner band and an external surface of the backbone member to form an outer band.

23. The hybrid structure of claim 10 wherein a length of the backbone member extends along at least two non-parallel axes.

24. The hybrid structure of claim 10, wherein the height of the backbone member varies along the length of the backbone member, and the height of the hybrid structure varies along the width of the backbone member, wherein height is measured along an axis Y and width is measured along an axis X.

* * * * *